United States Patent [19]

Volin et al.

[11] 3,865,586
[45] Feb. 11, 1975

[54] METHOD OF PRODUCING REFRACTORY COMPOUND CONTAINING METAL ARTICLES BY HIGH ENERGY MILLING THE INDIVIDUAL POWDERS TOGETHER AND CONSOLIDATING THEM

[75] Inventors: Timothy Earl Volin, Tuxedo; John Stanwood Benjamin, Suffern, both of N.Y.

[73] Assignee: The International Nickel Company, Inc., New York, N.Y.

[22] Filed: Nov. 17, 1972

[21] Appl. No.: 307,358

[52] U.S. Cl............... 75/203, 75/204, 75/211, 75/205, 75/201, 75/202
[51] Int. Cl............................................. B22f 1/00
[58] Field of Search ............ 75/200, 201, 202, 203, 75/204, 205, 206, 211

[56] References Cited
UNITED STATES PATENTS

| | | | |
|---|---|---|---|
| 3,013,875 | 12/1961 | Triffleman | 75/204 |
| 3,264,222 | 8/1966 | Carpenter et al. | 75/204 |
| 3,395,013 | 7/1968 | Friedman | 75/204 |
| 3,488,291 | 1/1970 | Hardy et al. | 75/204 |
| 3,591,362 | 7/1971 | Benjamin | 75/211 |
| 3,690,875 | 9/1972 | Bredzs et al. | 75/202 |

Primary Examiner—Benjamin R. Padgett
Assistant Examiner—B. Hunt
Attorney, Agent, or Firm—Ewan C. MacQueen; Raymond J. Kenny

[57] ABSTRACT

Ultra-hard refractory bodies of the cemented carbide type are produced by subjecting the desired powder constituents to dry, intensive high energy milling to produce composite particles which are then consolidated at elevated temperature.

6 Claims, No Drawings

METHOD OF PRODUCING REFRACTORY COMPOUND CONTAINING METAL ARTICLES BY HIGH ENERGY MILLING THE INDIVIDUAL POWDERS TOGETHER AND CONSOLIDATING THEM

The present invention is addressed primarily to ultra-hard alloys of the cemented carbide type.

By reason of undesirable problems attendant melting-casting-working processing, it is the prevailing practice to employ powder metallurgy techinques in producing refractory bodies such as the cemented carbides. Using the cobalt plus tungsten carbide combination as illustrative, it is standard procedure to first carburize tungsten powder and then crush the resulting powder to size. Thereupon, it is milled together with cobalt powder in the presence of an agent such as acetone, the purpose being to coat the carbide powder with cobalt. The acetone is driven off by heating and the powder is then admixed with a wax solution, the solvent being in turn evaporated. Subsequently, the powder is consolidated as by pressing and then sintered.

More recently, the "mechanical alloying" process, as described in U.S. Pats. Nos. 3,591,362 and 3,623,849 and incorporated herein by reference, has been proposed as a more expedient procedure. This involves subjecting preformed, crushed carbide powder and a ductile matrix metal powder to dry, intensive high energy milling as is accomplished, for example, in using a Spex mill or Szegvari mill attritor. The initial constituents become intimately united and interdispersed to form composite product powder particles which are then consolidated and sintered. By virtue of such processing, an ultra-hard refractory body is formed comprised of a relatively uniform dispersion of the hard phase, e.g., tungsten carbide, throughout the matrix metal.

In accordance with the present invention, the broad "mechanical alloying" concept is utilized but recourse by reason of necessity to the utilization of a preformed and crushed hard refractory compound powder (as is also common to "conventional" processing) such as tungsten carbide is obviated. Thus, elemental carbon can be used from the outset. And this obtains notwithstanding that cemented carbides specifically contemplated contain well over 4%, e.g., 4.5 to 10% or more, by weight of carbon. This development was quite unexpected for it was originally considered that since carbon is inherently soft and tends to plasticize, it would simply smear over the refractory metal if dry milled under high energy conditions, and thus interfere with the very objective sought, to wit, achieving a composite product powder comprised of a most intimate interdispersion of the constituents forming the initial mix.

In addition, it has been further found that prior to sintering it is frequently advantageous to heat treat the composite product powder particles over the range of about 1,200° to 1,800°F. as will be described in greater detail herein.

In carrying the invention into practice, refractory metal may be one or more from the group including tungsten, molybdenum, chromium, columbium, tantalum, titanium, zirconium, vanadium and hafnium. A constituent, e.g., carbon, capable of forming the desired compound with the refractory metal should be sired compound with the refractory metal should be present in an amount at least in stoichiometric relation thereto. In fact, it is often of marked benefit that an excess of such constituent be present beyond the required stoichiometric ratio, provided such excess does result in fine graphite formation in the sintered product. In addition to or in lieu of carbon, one or more of silicon, boron, nitrogen and oxygen can be used, nitrogen- and oxygen-containing atmospheres being used to form the respective refractory nitrides and oxides.

Cobalt, nickel, alloys thereof and cobalt and nickel-base alloys may be used as the matrix forming metal. Cobalt is generally preferred as a matrix for tungsten carbide while nickel is preferred, for example, in combination with titanium carbide. Suitable cobalt and nickel-base alloys include those containing one or more metals from the refractory group as well as iron, the iron not exceeding 40 or 50% by volume of the sintered product. If desired, in lieu of cobalt or nickel, another matrix metal or alloy can be used such as those from the group comprised of silver, copper, platinum, palladium, rhodium, rhenium, ruthenium, aluminum, lead and zinc.

In terms of composition, the refractory compound comprises at least 40%, advantageously 50% or 60% or more, by volume of the composite powder product particles, the balance essentially being ductile matrix metal. A particularly suitable ultra-hard alloy contains from 70 to 96% volume of a refractory compound such as tungsten carbide and the balance a matrix metal such as cobalt. Another satisfactory cemented carbide is formed of 70 to 90% titanium carbide (volume), the balance being nickel with or without molybdenum.

With regard to powder size, the initial constituent powders should not exceed 1,000 microns and are preferably less then 500 microns. In any case, by reason of being able to use elemental powders as opposed to the heretofore use of preformed and crushed powders of the refractory carbide type, carbide particle sizes over a wide range down to as small as 1 micron or less can be produced by varying processing conditions such as milling time, powder heat treatment and sintering temperatures, thereby effecting economies through lower raw materials costs and reduced inventories. The achievement of very fine carbide particle sizes is decidedly beneficial to hardness in the consolidated product.

The dry, intensive, high energy milling characteristic of the mechanical alloying process can be carried forth in vibratory ball mills and planetary ball mills as well as the Spex and attritor mills above mentioned, the important consideration being that the charge of initial components be subjected to accelerative forces of the impacting media, e.g., balls, which are kinetically maintained in a high state of relative motion. Not more than 25% or 40% of the impacting elements should be in static self-contact at any given time. A ratio of impacting media to powder, e.g., ball-to-powder, of at least 3:1 by volume, for instance 10:1 to 30:1, should be employed. The impacting elements may be formed from steel, including stainless steel, tungsten carbide, nickel, etc. In using relatively soft materials such as nickel it can be expected that a portion thereof will likely be "worn" therefrom and find its way into the final product particles. This is particularly true at the higher ball-to-powder ratios. Therefore, depending on the ultimate product to be produced, this nickel may be a contaminant. Thus, use of a harder impacting element would be desirable. Where maximum hardness is desired, steel or tungsten carbide attritive elements are preferable.

The following Schedule contains representative processing conditions using various size attritors and through hardened 52100 steel balls together with nitrogen or nitrogen-oxygen atmospheres.

SCHEDULE

| Attritor Size | Tank Diam. | Speed, RPM | Time, hours |
|---|---|---|---|
| 1 gallon | 9 inches | 300–400 | 10–30 |
| 4 gallon | 13 inches | 250–300 | 10–30 |
| 10 gallon | 16 inches | 130–200 | 10–30 |

Upon interdispersing the constituents of a hard refractory compound, such as tungsten carbide, with a matrix metal such as cobalt, the composite particle so produced may advantageously prior to sintering be subjected to a preheat treatment over the range of about 1,200° to 1,800°F. In the absence of this treatment, it has been found that certain adverse effects can ensue. It is believed that this is likely attributable to nitrogen and/or oxygen being absorbed on the mechanically alloyed composite powder surfaces. This in turn subsequently interferes with the sintering operation.

The preheat treatment is not deemed necessary in all instances, although it can be used if desired. In the case of tungsten carbide, which is more stable than the oxide or nitride, oxygen and/or nitrogen absorbed on the particle surfaces will be released during heating for sintering. This can result in cracking of the compact. In the case of, say, titanium carbide, the oxide and nitride are more stable than the carbide. No gas will be evolved, resulting in a solid product. Thus, for refractory compounds which would behave as does tungsten carbide and using a nitrogen or nitrogen-oxygen atmosphere during milling, a preheat treatment should be employed. A temperature of about 1,500° to 1,700°F. is particularly satisfactory. In the case of tungsten carbide, the carbon lost as a consequence thereof should be allowed for in the original charge in order to achieve the required stoichiometric ratio desired in the product. The excess quantity required will be a function of the oxygen content of the processed composite powders and the atmosphere used in the preheat treatment and can be determined experimentally. The period of preheating need not exceed 2 to 3 hours, one-half hour usually being sufficient. In the case of compounds which behave as does titanium carbide, the possibility of the occurrence of free graphite, displaced from the carbide by oxygen and/or nitrogen, exists. This detracts from properties as hardness and should be determined and compensated for in like manner.

The preheat treatment is followed by consolidation and sintering and these procedures can be carried out in any number of ways well known to those skilled in the art. For example, the composite product powder particle can be consolidated by either hot or cold pressing to a desired green density and then sintered at an elevated temperature, e.g., 2,400°F., under protective conditions, vacuum, argon, etc. Alternatively, consolidation and sintering can be conducted simultaneously as by hot pressing. Since the tungsten carbide-cobalt eutectic is about 2,400°F., a liquid phase exists at sintering temperatures above this temperature, hence the term "liquid phase sintering" is generally applied to this sintering process. The existence of this liquid is deemed necessary to achieve virtually complete densification. Given this, sintering should be conducted within the range of 2,200° to 2,600°F., preferably 2,400° to 2,550°F. Temperatures above 2,600°F. for extended sintering periods, i.e., longer than one-half hour, tend to coarsen the microstructure.

The following data and examples will serve to illustrate various aspects of the invention.

EXAMPLE I

A charge of 15 gms of tungsten (5 microns), 0.98 gms of flake graphite and 4 gms of cobalt (5 microns) was placed in a Spex mill containing 40 gms of nickel balls. Mechanical alloying was conducted for various periods as given in Table I, the mill being oscillated at 20 cycles per second. A ball-to-powder volume ratio of 3:1 was used and the same consolidation conditions were employed in each case for each run, to wit, hot pressing at 2,400°F. at 3,500 psi. Hardness of the resulting refractory composite particles was then determined.

TABLE I

| Processing Time Hours | Volume Ratio ball/powder | Ball Type | Hardness, $R_{(A)}$ |
|---|---|---|---|
| 1 | 3 | nickel | 90.5 |
| 2 | 3 | nickel | 89.6 |
| 3 | 3 | nickel | 89.2 |

In terms of hardness, the foregoing reflects that little is gained by using a processing time beyond 1 hour under high energy conditions afforded by the Spex mill or equivalent apparatus. As indicated previously, in using an attritor mill, periods of 10 to 30 hours would be suitable. The important consideration is that processing time be sufficient to achieve a desired fine, homogeneous carbide structure in the consolidated product.

EXAMPLE II

Again using the Spex mill, the effect of using different ball-to-powder ratios (volume) was investigated. The same general procedure was otherwise followed as described in Example I.

TABLE II

| Processing Time hours | Volume Ratio ball/powder | Ball Type | WC % | Ni % | Hardness, $R_{(A)}$ |
|---|---|---|---|---|---|
| 2 | 3 | nickel | 79 | 2.13 | 89.6 |
| 2 | 13.5 | nickel | 72 | 7.0 | 88.8 |
| 2 | 33.2 | nickel | 60 | 18.1 | 80.0 |

The above immediate data indicates that a ball-to-powder ratio of less than say 30 should be used, particularly with nickel balls. It will be observed that considerable "nickel pickup" from the balls occurred as is evident from the contained nickel content of the composite product powder. This was accompanied by considerable hardness loss.

EXAMPLE III

Using a 1-gallon attritor mill, the effect of varying the consolidation (hot pressing) temperature was determined.

The powder charge was as follows: 1,020 gms of tungsten, 267 gms of cobalt and 74 gms of carbon. The ball-to-powder ratio was 18:1, the impeller speed 170 rpm, with nickel balls as the impacting media. A nitrogen atmosphere was employed and the attriting period covered 30 hours. The results are given in Table III.

TABLE III

| Hot Pressing Temp.,°F. | Pressure, psi | Time, hrs. | Hardness $R_{(A)}$ |
|---|---|---|---|
| 1800 | 3000 | 3 | 79 |
| 2000 | 3500 | ½ | 87 |
| 2200 | 3500 | 1-½ | 86 |
| 2400 | 3500 | ½ | 94 |
| 2600 | 3500 | ½ | 90 |

A hot pressing temperature of 2,000° to 2,600°F. is suitable over a period of one-half hour or more. Shorter periods down to a few minutes or less can be used at the recommended temperatures of 2,300° to 2,500°F.

EXAMPLE IV

In order to ascertain the effects of various preheat treatment temperatures, a powder charge consisting of 53.4 gms graphite, 816.6 gms tungsten powder (5 microns) and 130 gms cobalt powder (5 microns) was processed for 20 hours in an I-S attritor with 37 pounds (26:1 ball-to-powder ratio) of AISI 52100 steel balls (5/16 inch dia.) in a flowing nitrogen atmosphere with minor air additions, the impeller speed being about 350 rpm. Using a Fisher sub-sieve particle analyzer it was determined that the processed powder had an average particle diameter of 3.31 microns. The powder was then heat treated in hydrogen within the temperature range of 750° to 1,800°F. and chemically analyzed for retained gas content and X-Ray analyzed for phases present.

The material heat treated at 1,600°F. had virtually no retained oxygen and nitrogen contents, the phases present being predominantly tungsten carbide and free cobalt. This powder was compacted in a die at 40,000 pounds per square inch and sintered for one-half hour at 2,500°F. in argon plus 10% hydrogen atmosphere. The resulting piece was sound, free of porosity, and had a room temperature hardness of about 89 Rockwell A. The resulting tungsten carbide content was about 72% by volume.

In contrast using preheat treating temperatures below, say, 1,500°F., it was noted that some $W_2C$ carbide was formed which is known to be deleterious. Below 1,400°F. the oxygen content was not significantly lowered. At 1,800°F. no further reaction had taken place but the retained nitrogen content increased and the powder agglomerated considerably. This rendered it difficult to consolidate. As referred to above herein, a preheat treating temperature of 1,500° to 1,700°F. is deemed to be particularly beneficial.

EXAMPLE V

A further test was conducted to produce a primarily titanium carbide dispersion in a nickel matrix. Thus, a powder charge consisting of, by weight, 840 gms of a master alloy containing 14.6% nickel, 13.1% molybdenum and 72.3% titanium, prepared by vacuum induction melting and crushing and grinding in an inert atmosphere, plus 160 gms of carbon was processed in a 1-gallon attritor at 350 rpm with 52100 grade steel balls at a ball-to-powder volume ratio of 9:1 for 20 hours in a flowing nitrogen atmosphere. A compact was made by pressing the resulting powder in a die at 25 tons per square inch pressure and sintering at 2,500°F.

in argon for one-half hour. The resulting piece was fully dense and had a high hardness. The microstructure revealed that carbide had been formed by the in situ reaction of titanium and molybdenum with the carbon.

As can be seen from the foregoing, the production of composite powder refractory hard particles as contemplated herein is an in situ operation, carburization and crushing being eliminated as well as recourse to milling liquids. Insofar as we are aware, the subject invention is the first instance of actually interdispersing the ingredients of a hard refractory compound with a metal matrix and forming the compound by an in situ reaction. The structure so produced is comprised of a fine dispersion of refractory compound in a metal matrix, the particle so obtained being compactable and sinterable without porosity problems developing.

Though the thrust of the subject invention has been described in connection with the utilization of elemental powders, there are occasions when it is desirable that one of the initial constituents be in master or prealloyed form. Thus, for example, it is most convenient, if not necessary, in forming a cemented refractory containing titanium carbide dispersed in nickel or nickel-molybdenum to introduce the titanium in the form of a master alloy of nickel-titanium or nickel-titanium molybdenum. The reason for this is the highly reactive nature of the titanium. A nickel-molybdenum-titanium master alloy was used in EXAMPLE V. If desired, even a part of the carbon (also silicon, boron, nitrogen and oxygen) can be introduced in compound form, but at least 25% or 50% and preferably all of the refractory compound forming constituents, e.g., tungsten and carbon, should be added in the unreacted (non-chemically combined) state. In this connection, a composite powder of titanium carbide and molybdenum carbide dispersed in nickel was prepared from 730 gms of a master alloy of 16.8% nickel and 83.2% titanium, 117 gms of $Mo_2C$ and 153 gms flake graphite, the conditions of EXAMPLE V being used.

In addition to the production of machining tools, wire drawing dies, cold heading dies, wear parts and other products requiring exceptional hardness, the invention lends itself to the production of hard tire studs used for traction in tires. Certain carbide composites, notably those containing titanium and chromium carbides are deemed useful for high temperature applications.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for producing a hard refractory body having at least one refractory compound dispersed throughout a metal matrix, the refractory compound(s) constituting at least about 40% by volume of the refractory body, which comprises forming a powder charge containing (i) a plurality of powder particles containing at least one hard refractory compound forming metal, (ii) powder particles of at least one constituent capable of combining with the refractory forming metal(s) to form the desired refractory compound(s), the said constituent being present in at least a stoichiometric relation to the refractory metal, and (iii) powder particles of at least one matrix binder metal, subjecting the powder charge to dry, intensive, high energy milling for a period sufficient to form composite particles in which the constituents of the refractory compound(s) and the matrix metal are intimately united and interdispersed, and thereafter consolidating the composite particles and sintering at an elevated temperature to produce the desired hard refractory body.

2. A process in accordance with claim 1 in which a portion of the refractory forming elements comprising the powder charge is added in compound form.

3. A process for producing a hard refractory body having at least one refractory compound dispersed throughout a metal matrix, the refractory compound(s) constituting at least about 40% by volume of the refractory body, which comprises forming a powder charge containing (i) a plurality of powder particles of at least one hard refractory compound forming metal, (ii) powder particles of at least one constituent capable of combining with the refractory metal(s) to form the desired refractory compound(s), the said constituent being present in at least a stoichiometric relation to the refractory metal, and (iii) powder particles of at least one matrix binder metal, subjecting the powder charge to dry, intensive, high energy milling for a period sufficient to form composite particles in which the powder constituents of (i), (ii) and (iii) are intimately united and interdispersed, subjecting the composite particles to a preheat treatment within the range of about 1,200°F. to about 1,800°F. to facilitate subsequent sintering and then consolidating the composite particles and sintering at an elevated temperature to produce the desired hard refractory body.

4. A process in accordance with claim 3 in which the preheat treatment temperature is from about 1,500°F. to about 1,700°F.

5. A process in accordance with claim 3 in which the refractory compound forming metal is tungsten, the constituent forming the refractory compound is carbon and the matrix metal is essentially cobalt.

6. A process for producing a hard refractory body having at least one refractory compound dispersed throughout a metal matrix, the refractory compound(s) constituting at least about 40% by volume of the refractory body, which comprises forming a powder charge containing (i) a plurality of powder particles containing least one hard refractory compound forming metal, graphite particles to combine with the refractory forming metal(s) to form the desired refractory compound(s), the graphite particles being present in at least a stoichiometric relation to the refractory metal, and (iii) powder particles of at least one matrix binder metal, subjecting the powder charge to dry, intensive, high energy milling at a ball-to-powder ratio of at least about 10:1 and for a period sufficient to form composite particles in which the constituents of the refractory compound(s) and the matrix metal are intimately united and interdispersed, and thereafter consolidating the composite particles and sintering at an elevated temperature to produce the desired hard refractory body.

* * * * *